United States Patent [19]

de Waard et al.

[11] Patent Number: 5,262,953
[45] Date of Patent: Nov. 16, 1993

[54] METHOD OF RECTIFYING IMAGES FROM GEOSTATIONARY METEOROLOGICAL SATELLITES IN REAL TIME

[75] Inventors: Johannes de Waard, Mühltal; Jan Adamson, Darmstadt, both of Fed. Rep. of Germany; Albert M. Bos, Reeuwijk, Netherlands

[73] Assignee: Agence Spatiale Europeenne, Paris, France

[21] Appl. No.: 691,001
[22] PCT Filed: Oct. 31, 1990
[86] PCT No.: PCT/FR90/00787
§ 371 Date: Jun. 18, 1991
§ 102(e) Date: Jun. 18, 1991
[87] PCT Pub. No.: WO91/06919
PCT Pub. Date: May 16, 1991

[30] Foreign Application Priority Data

Oct. 31, 1989 [FR] France ................... 89 14264

[51] Int. Cl.$^5$ .............................................. B64G 1/36
[52] U.S. Cl. ................................. 364/459; 358/109; 342/356
[58] Field of Search ............... 364/434, 459; 244/164, 244/171; 342/356; 358/109

[56] References Cited

U.S. PATENT DOCUMENTS

| | | | |
|---|---|---|---|
| 4,752,884 | 6/1988 | Slafer et al. | 364/434 |
| 4,827,422 | 5/1989 | Savoca | 364/459 |
| 5,062,051 | 10/1991 | Sainct et al. | 364/459 |
| 5,109,346 | 4/1992 | Wertz | 364/459 |

OTHER PUBLICATIONS

Wolff, "An image geometry model for Meteosat," 1985, Int. Journal of Remote Sensing, vol. 6, No. 10, pp. 1599-1606.
J. Adamson, et al.: "Rectification Quality Assessment of Meteosat Images", ESA Journal 1988, vol. 12, 1988, pp. 467-482.
G. Zhaozeng, et al.: "Geometric Distortion Correction for Satellite Panoramic Picture", Signal Processing IV: Theories and Applications, Proceedings of EUSPICO-88, Grenoble, Sep. 5-8, 1988, vol. III, EURASIP, Elsevier Science Publ. B.V. (NL), pp. 1669-1671.
T. Wolff: "A Simple Approach to Solve the Meteosat Image Deformation Problem Based on Horizon Extraction from Image Data and Orbit Information", Spacecraft Flight Dynamics, ESQ SP-160, Proceedings of an International Symposium, Darmstadt, May 18-22, 1981, pp. 293-298.

Primary Examiner—Thomas G. Black
Attorney, Agent, or Firm—Bell, Seltzer, Park & Gibson

[57] ABSTRACT

A real time method of rectifying remotely sensed image data provided by a radiation measuring instrument, such as used on spin stabilized geostationary satellites, rectification being obtained by determining a number of satellite parameters including radiation measuring instrument pointing parameters, the method comprising the following steps:

1) prediction of the rectification parameters by statistical analysis from a number of preceding images;
2) reading a limited number of raw image lines to facilitate accurate position of the South or North horizon, depending on scan direction of the incoming image;
3) determining the spin rate of the satellite from the limited number of raw image lines and predicting the spin rate variations for the rest of the image;
4) refining the attitude and the radiation measuring instrument pointing parameters using the horizon information obtained in real time;
5) computing the position of the other horizon and the center of the image based on the first detected horizon and geometrical data;
6) generating of a deformation matrix immediately following determination of the first horizon, and
7) rectifying the incoming image data immediately after in real time.

3 Claims, 1 Drawing Sheet

METHOD OF RECTIFYING IMAGES FROM GEOSTATIONARY METEOROLOGICAL SATELLITES IN REAL TIME

The present invention relates to a method of rectifying images from geostationary meteorological satellites in real time.

BACKGROUND OF THE INVENTION

The geostationary meteorological satellites that are currently in orbit (i.e. satellites orbiting at about 36,000 km above the Earth over the Equator and having an orbital period of 24 hours so that they are always over the same point on the Earth and appear to be stationary in the sky) are the European satellite METEOSAT, the American GOES satellites, and the Japanese satellite GMS, and they are used for taking meteorological images. All of these use the same principle for scanning the Earth, namely in that lines of data are constructed by each satellite rotating about its own longitudinal axis, which axis is held parallel with the North-South (N-S) axis of the Earth.

No geostationary satellite can be assumed to be in a position which is exactly fixed relative to the Earth: its orbit, its attitude, its speed of rotation, and its scan start point all vary over time relative to ideal values. This gives rise to images which are deformed relative to corresponding reference images as might have been taken under nominal conditions (i.e. absolutely stable conditions).

This situation requires the deformation of the images to be determined with high accuracy and the data relating to the images as transmitted by a satellite and received thereto to be corrected before being used.

With the above-mentioned satellites, such correction can be done only after a complete image of the Earth has been received. In particular, for a satellite such as METEOSAT, this gives rise to a delay before the corrected image can be disseminated to users, which delay may be as much as 40 minutes for the portion of the image which corresponds to the Southern hemisphere and as much as 20 minutes for the portion which corresponds to Europe. Although such delays are theoretically acceptable for meteorologists using the images for the purpose of making conventional weather forecasts over periods of up to one week, they are completely unacceptable for a detailed description of the weather together with forecasts obtained by extrapolation of up to two hours ahead (sometimes called "nowcasting", cf. the definition given by K. A. Browning in the introduction to "Proceedings of the second international symposium on nowcasting" edited by B. Battrick and E. Rolfe, Norrkoeping, Sweden, Sep. 3–7, 1984).

The most relevant prior art relates to the European METEOSAT satellite which is stabilized by spinning about its own axis and which takes one image of the Earth every half hour. Such a period of half an hour between received images is called a "slot". Four images are taken simultaneously, one in the infrared, two in the visible, and one in the water vapor band. A telescope is made to scan through 18° in the S-N direction, giving a full Earth scan of 2,500 lines in 25 minutes. Each of the 2,500 lines constituting the thermal infrared image and the water vapor image has 2,500 picture elements ("pixels"). However, a single visible channel has 2,500 lines of 5,000 pixels each, thus since two visible channels are operated simultaneously, each looking at alternate image lines, a total of 5,000 lines of visible data are available, giving 5,000×5,000 pixels per visible image.

The image data is received by the Data Acquisition, Telecommand and Tracking Station (DATTS) from where it is sent to the METEOSAT Ground Computer System (MGCS) located at the European Space Operations Center (ESOC) at Darmstadt, Germany.

The European METEOSAT satellite system has been in operation since Dec. 9, 1977. METEOSAT occupies longitude 0 (Greenwich) above the Equator. Its imaging system always sees the same portion of about ⅓rd of the surface of the Earth. The raw image comes from a radiometer which takes 25 minutes to "sample" the Earth. A system of mirrors splits up radiation into three spectral bands and directs it to three detectors: one of these is sensitive to light (500 nm to 1000 nm), another to infrared radiation in the range 10,500 to 12,500 nm (thermal radiation), and the third, also in the infrared, in the range 5700 nm to 7100 nm (the water vapor band). The signal from each detector is amplified, filtered, converted from analog-to-digital form, and is then stored (the Earth seen from 36,000 km occupies an angle of 18°).

The main ground station for the METEOSAT satellite is situated southeast of Frankfurt in Germany. The raw image as received is transmitted from there by cable to ESOC. The images are then fed to a processor system where they are geometrically corrected, calibrated, and evaluated.

The images in the visible spectrum occupy 5,000 lines of 5,000 points per line: in other words there are 25 million pixels. Each pixel may occupy 64 different possible brightness values. The infrared images comprise 2,500 lines of 2,500 points each, with each point being encoded on 256 values. Finally, the water vapor images comprise 6.25 million points, like the infrared images, each point being encoded on 256 values.

It should now be specified that the above-mentioned points represent a resolution of 2,5 km in visible light and of 5 km in the infrared. These optimum values are valid for the surface immediately beneath the satellite (Gulf of Guinea).

The raw images are processed and evaluated in several different ways at the Darmstadt Center in order to make them useful for meteorogical research. METEOSAT is then used as a broadcast relay for transmitting selected images to various weather centers, research institutes, and other interested parties. These processed images are transmitted to the satellite from the Darmstadt ground station and they are retransmitted by the satellite at appropriate frequencies.

Further information about METEOSAT may be found in the publication "Introduction to the METEOSAT operational system" ESA-BR32, September 1987, and also in an article by Wolf entitled "An image geometry model for METEOSAT", published in Int. J. Remote Sensing, 1985, Vol. 6, No. 10, pp. 1599 to 1606.

At present, image data is demultiplexed in a front-computer system and stored, in the form of raw images, on a disk memory, and the data is processed sequentially in three main steps which are illustrated in FIG. 1 accompanying the present description, namely:

1) determining the geometrical parameters of the image system;

2) calculating the deformation matrix (i.e. the difference between the real image and the reference image); and 3) rectifying the raw image as mentioned above on the basis of the information in the above-mentioned deformation matrix.

These three steps correspond to "geometrical image processing" as described in the scientific literature for the purpose of reconstructing a geometrically nominal image.

The rectified image is disseminated by the METEOSAT satellite to a large number of users including national weather forecasting centers as well as amateurs.

The computer processing of the raw image serves to determine the parameters that are necessary for establishing the geometrical deformation of the raw image corresponding to slot $k-1$. This set of parameters, referred to by reference $P_{k-1}$, is used for calculating the geometrical deformation over a certain number of grid points ($26 \times 26$ in the intended application of the present invention). The following variables are taken into consideration:

i) the rate of satellite rotation about its longitudinal axis (spin rate);

ii) the orbit and the attitude of the satellite;

iii) satellite parameters relating to sensor pointing (in a three-dimensional frame of reference);

iv) East-West (E-W) centering of the Earth disk in the image; and v) the positions of the North and South horizons.

The spin rate of the satellite is measured by the timing system of the satellite.

The orbit and attitude of the satellite are determined off-line from METEOSAT's telemetry data and predicted for the following days. This orbit information is used without modification. The attitude based on telemetry is used as an initial value, while the infrared North and South horizons are used for improving the accuracy of the attitude. This improvement is necessary because METEOSAT does not, for economical reasons, have a sophisticated attitude measurement system like a star mapper, therefore the measured attitude is not of sufficient accuracy for geometrical processing.

The East and West horizons in the raw image are used for refining (improving) the location of the East-West center, while the North and South horizons are used for refining the South-North position of the image.

The set of parameters $P_{k-1}$ refined in this way is used for determining the deformation of the raw image on the above-mentioned grid points. The deformation on each of these points is a vector representing the image deformation in lines and pixels. The set of values corresponding to these deformations is collected in the form of a deformation matrix $D_{k-1}$. The precise method of determining this matrix is described by Wolff in the article entitled "A simple approach to solve the METEOSAT. image deformation problem based on horizon extraction from image data and orbit information", Proc. Int. Symp. Spacecraft Flight Dynamics, DARMSTADT, FRG, May 18-22, 1981, ESA SP-160, Aug. 1981, and also in the other article by Wolff already mentioned above. The deformation matrix constitutes the input to the rectification program which interpolates deformation on the basis of the abovementioned grid points so as to find the deformation for each of the pixels in the rectified image, and it applies this deformation to correct the location of the pixel in the raw image.

The simple concept of a satellite stabilized by spinning about its longitudinal axis, together with the use of the image data itself to improve the accuracy of the geometrical parameters yields an rms error or less than 2 pixels. This rms error has been determined by correlating certain control points with reference data (cf. MUNDOCART Cartographical Database, Petroconsultants, CES Ltd., Cambridge, UK). This measuring method has been described in detail by J. Adamson, G. W. Kerr, and G. H. P. Jacobs in the article entitled "Rectification of quality assessment of Meteosat images", published in ESA Journal, Vol. 12, pp. 467 to 482, 1988.

As a consequence of this existing method, geometrical image processing can only be commenced after the entire Earth disk has been received (all infrared horizons are used). The image of slot $k-1$ is processed while the image of slot k is being received, as illustrated in FIG. 1. Image processing itself requires about 6 to 8 minutes. Subsequently the image data is disseminated to METEOSAT users. This means that users in the Southern hemisphere must wait for approximately 40 minutes before they receive the images that cover their area, whereas European users must wait for about 20 minutes before receiving the corresponding image.

The object of the present invention is therefore to enable a geostationary meteorogical satellite to respond better to the practical need for satellites of this type aimed at the same objectives as known but in which image deformation correction is performed in real time, and without the need for an additional sophisticated attitude detector on-board the satellite.

SUMMARY OF THE INVENTION

The present invention provides a real time method of rectifying remotely sensed image data provided by a radiation measuring instrument, such as used on spin stabilized geostationary satellites, rectification being obtained by determining a number of satellite parameters including radiation measuring instrument pointing parameters, the method comprising the following steps:

1) prediction of the rectification parameters by statistical analysis from a number of preceding images;

2) reading a limited number of raw image lines to facilitate accurate position of the South or North horizon, depending on scan direction of the incoming image;

3) determining the spin rate of the satellite from the limited number of raw image lines and predicting the spin rate variations for the rest of the image;

4) refining the attitude and the radiation measuring instrument pointing parameters using the horizon information obtained in real time;

5) computing the position of the other horizon and the center of the image based on the first detected horizon and geometrical data;

6) generating of a deformation matrix immediately following determination of the first horizon, and 7) rectifying the incoming image data immediately after in real time.

According to a preferred embodiment or implementation of the method, the radiation measuring instrument consists of a radiometer as accomodated on European METEOSAT satellites.

BRIEF DESCRIPTION OF THE DRAWING

The invention will be better understood from the following description made with reference to FIG. 2 of the accompanying drawing which is a block diagram illustrating the method of the invention and clearly showing the difference between the method of the invention and the prior art as schematically illustrated in FIG. 1.

DETAILED DESCRIPTION

The real time image rectification method of the present invention is similar in some respects to the existing system since in the system of the invention, geometrical image processing is also based on the following three steps, namely:
i) parameter evaluation;
ii) determining the deformation matrix; and
iii) rectification.

Figure 1:
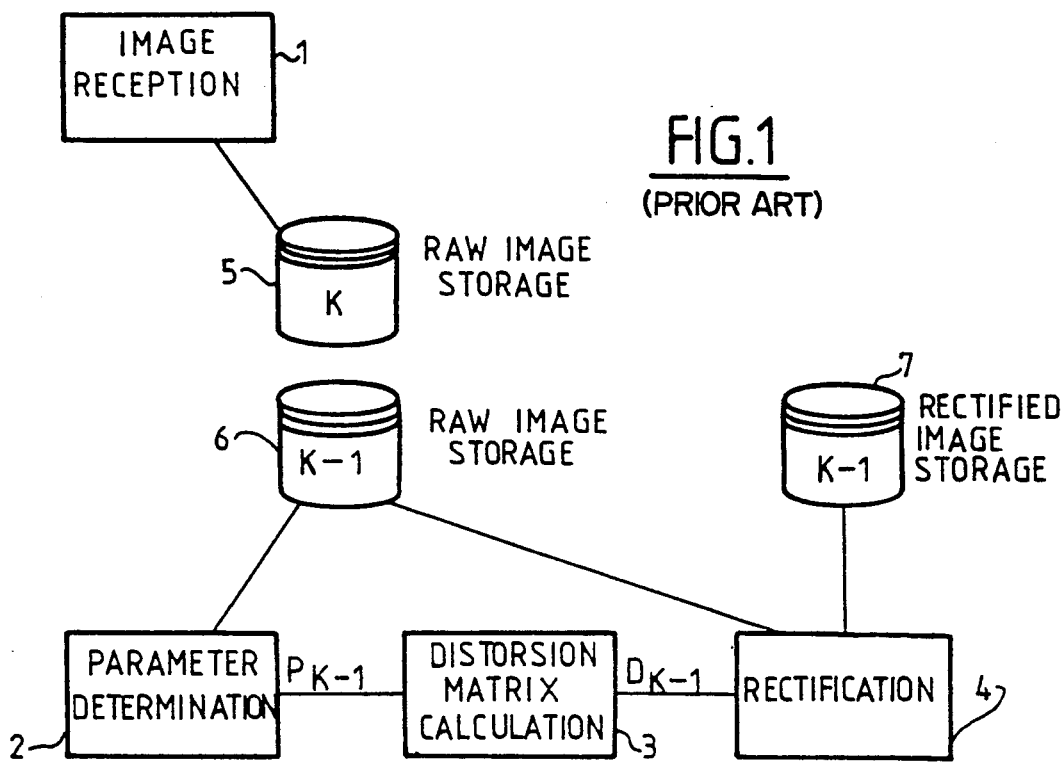
Figure 2:
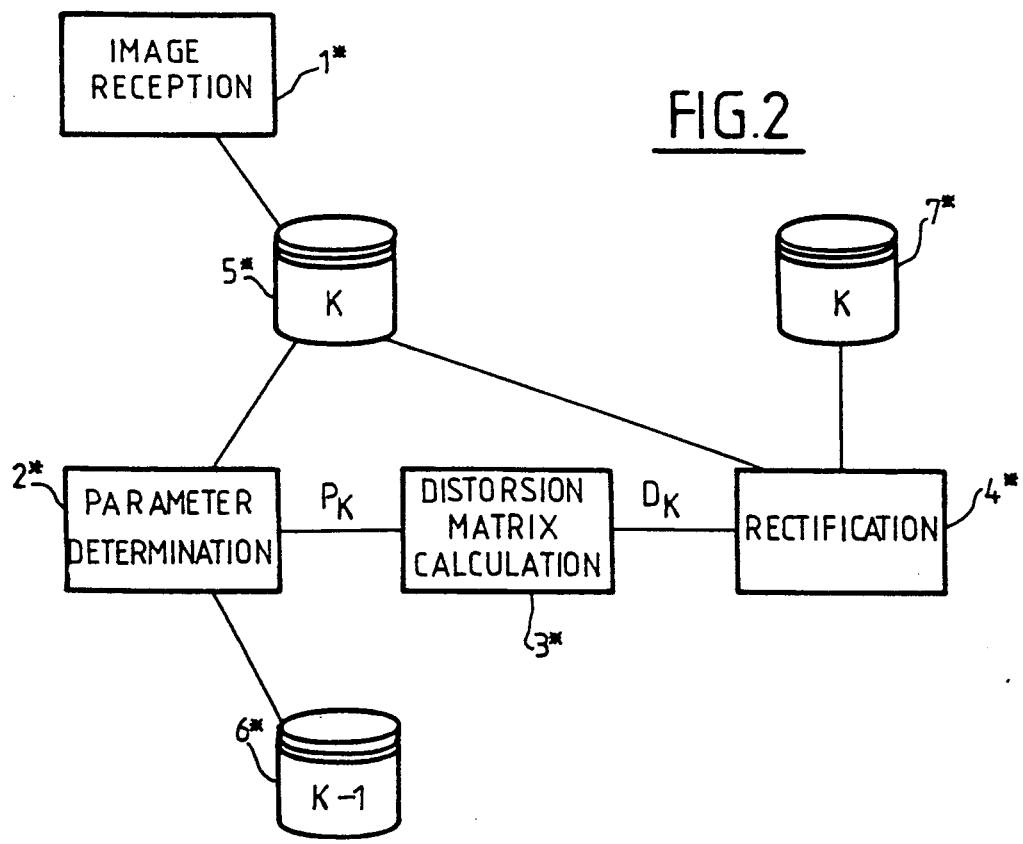

FIG. 2 graphically represents the flow of data that occurs in real time rectification. The correspondence between FIGS. 1 and 2 is very clear and does not require special description: blocks 1*, 2*, 3*, and 4* of FIG. 2 correspond to blocks 1, 2, 3, and 4 of FIG. 1, and cylinders 5* to 7* and 5 to 7 correspond to disk memories.

Given that most of the disturbances that affect satellite parameters are periodic in nature, it would be logical to expect that the deformation matrix corresponding to the current slot could be based merely on statistical analysis of the information established for earlier slots. However, Applicant has experienced that such a system cannot provide the required accuracy.

The real time rectification of the present invention uses a unique way of combining parameters than can be estimated on the basis of statistical analysis of the parameters established for earlier slots, together with parameters that can be determined from the incoming data.

Only this combination of estimated (extrapolated) and measured parameters leads to the required accuracy.

The method described below is based on a South to North scanning of the Earth. However, the invented method is as well applicable to satellite radiation measuring instruments scanning from North to South.

This method of real time estimation of the set of parameters $P_k$ is performed for the image K directly at the beginning of slot k. At this time, the East, West and North horizons as used in the rectification scheme of the invention are not yet available. However, it has been observed that disseminating rectified image data is not useful before at least some image data is present containing the South horizon. So the South horizon can be used to improve parameter accuracy. This implies that the position of the South horizon can be measured as well as the East-West horizon determined before the rectification process is commenced. In addition, this provides the advantage that the offset of the satellite's spin rate about its axis can be determined from timing information in the first image lines.

Under these circumstances, the only parameters which are not known at this point in time are the refined attitude and radiation measuring instruments pointing parameters, as well as the location of the North horizon within the image.

However, the attitude can be refined and one of the radiation measuring instrument pointing parameters determined using the South horizon only. In addition, it can be assumed that the other pointing parameters remain constant over one slot, which means that they can be kept the same as for the preceding image. Finally, the North horizon can be determined from the position of the satellite, the Earth's polar radius, and pointing parameters, i.e. the satellite sensor parameters.

It is possible to take account of variations in the spin rate of the satellite about its axis by means of a first order differential equation forming a part of an appropriate algorithm known under the name Kalman filter (cf. A. Gelb, "Applied optimal estimation", MIT Press, 1974).

A prototype of the system for generating the deformation matrix and for estimating the parameters has been developed by the Applicant and tested over several months, which has demonstrated the accuracy and the quality of the method.

The tests were performed taking account of METEOSAT as a basis for comparison.

The method of the present invention may be applied to instant weather forecasting as required in road and air traffic control.

What is claimed is:

1. A real time method of rectifying remotely sensed image data provided by a radiation measuring instrument, such as used on spin stabilized geostationary satellites, rectification being obtained by determining a number of satellite parameters including radiation measuring instrument pointing parameters based upon a number of preceding images, the method comprising the following steps:
   (a) reading a limited number of raw image lines to facilitate accurate position determination of a South horizon;
   (b) determining a spin rate of the satellite from the limited number of raw image lines and predicting the spin rate variations for the rest of the image;
   (c) refining an attitude parameter and the radiation measuring instrument pointing parameters in real time based upon the determination of the South horizon;
   (d) computing the position of a North horizon and the center of the image based on the determination of the South horizon and geometrical data;
   (e) generating a deformation matrix immediately following determination of the South horizon; and
   (f) rectifying the incoming image data immediately after receipt of the incoming image data in real time.

2. Method according to claim 1, wherein the radiation measuring instrument consist of a radiometer as accomodated on European Meteosat satellites.

3. A real time method of rectifying remotely sensed image data provided by a radiation measuring instrument, such as used on spin stabilized geostationary satellites, rectification being obtained by determining a number of satellite parameters including radiation measuring instrument pointing parameters based upon a number of preceding images, the method comprising the following steps:
   (a) reading a limited number of raw image lines to facilitate accurate position determination of a North horizon;
   (b) determining a spin rate of the satellite from the limited number of raw image lines and predicting the spin rate variations for the rest of the image;
   (c) refining an attitude parameter and the radiation measuring instrument pointing parameters in real time based upon the determination of the North horizon;
   (d) computing the position of a South horizon and the center of the image based on the determination of the North horizon and geometrical data;
   (e) generating a deformation matrix immediately following determination of the North horizon; and
   (f) rectifying the incoming image data immediately after receipt of the incoming image data in real time.

* * * * *